UNITED STATES PATENT OFFICE.

CARL J. ANDERSON, OF MUSKEGON, MICHIGAN, ASSIGNOR OF ONE-HALF TO JOHN G. SANDVALL, OF MUSKEGON, MICHIGAN.

TEMPERING COMPOUND.

1,215,759.  Specification of Letters Patent.  Patented Feb. 13, 1917.

No Drawing.  Application filed December 20, 1915. Serial No. 67,881.

*To all whom it may concern:*

Be it known that I, CARL J. ANDERSON, a citizen of the United States of America, residing at Muskegon, in the county of Muskegon and State of Michigan, have invented certain new and useful Improvements in Tempering Compounds; and I do hereby declare the following to be a full, clear, and exact description of the invention, such as will enable others skilled in the art to which it appertains to make and use the same.

This invention relates to a tempering compound which it is designed may be mixed with water, the mixture thereafter being used as a fluid for the tempering of tool steel. Ordinarily, in the process of tempering, steel is heated to a comparatively high degree of temperature or until the steel takes on a cherry red color after which it is immersed in water. If nothing more is done the steel is very hard and brittle and undue strains are produced which in a little while cause the breakage of the material and in any event the steel is not practically useful. Accordingly it is necessary after the steel has been cooled by plunging it into water to withdraw it and heat it again over a fire, this second process of heating being known as "drawing the temper," that is taking away the extreme hardness and brittleness of the metal. If the process is skilfully performed a tool thus tempered will stand hard usage but ordinarily it is not easy except to those highly skilled to obtain a uniform temper each time.

The tempering compound which forms the subject matter of my invention may be mixed with water and after the tool has been heated to a cherry red color it is immersed in a mixture of this compound and water and held until the tool is cool. I have found that a compound made in accordance with my disclosure when properly mixed with water has the effect of producing a uniform and proper temper of the tool so that after it has once been heated and immersed nothing further need be done and any one, no matter how unskilled, can produce an even and uniform grade of tempered steel.

For the production of my tempering compound I first take by weight, avoirdupois, one and one-half pounds of crushed or rolled oats and mix therewith one-half pound of wheat bran. This is then placed in a receptacle and covered with water after which it is allowed to remain for twenty-four hours, being then strained and as much of the liquor drawn off as is possible. I then take two ounces of bi-carbonate of potash, one and one-half pounds of common salt and one-half ounce of permanganate of potash and mix these ingredients together after which they are placed in a receptacle with about three pints of water, the whole then being brought to the boiling point. When the boiling point is reached the solution obtained is poured slowly into the receptacle which contains the liquor strained from the oats and bran and the whole mixed together with a pinch of nitrate of strontium.

I have found that a compound of this character and produced in the quantity above stated may be diluted with from eight to ten gallons of water and the tempering solution thus obtained will serve to properly and evenly temper tool steel of any character from the common and ordinary tool steel to high speed steels without the necessity of drawing the temper after the heated steel has been immersed in the solution.

I claim:—

1. A tempering compound made from liquor drawn from crushed oats and wheat bran soaked in water and mixed with a solution formed from bicarbonate of potash, common salt and permanganate of potash to which mixture is added a small amount of nitrate of strontium.

2. A tempering compound comprised of liquor drawn from crushed oats soaked in water and mixed with a solution of bi-carbonate of potash, common salt and permanganate of potash to which mixture is added a small amount of nitrate of strontium.

In testimony whereof I affix my signature.

CARL J. ANDERSON.

Copies of this patent may be obtained for five cents each, by addressing the "Commissioner of Patents, Washington, D. C."